(12) United States Patent
Matsumoto

(10) Patent No.: US 10,190,461 B2
(45) Date of Patent: Jan. 29, 2019

(54) EXHAUST GAS CONTROL SYSTEM FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Arifumi Matsumoto, Gotenba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 10 days.

(21) Appl. No.: 15/649,899

(22) Filed: Jul. 14, 2017

(65) Prior Publication Data

US 2018/0023441 A1 Jan. 25, 2018

(30) Foreign Application Priority Data

Jul. 19, 2016 (JP) .................................. 2016-141602

(51) Int. Cl.
| | |
|---|---|
| *F01N 3/00* | (2006.01) |
| *F01N 3/20* | (2006.01) |
| *F01N 11/00* | (2006.01) |
| *F01N 13/00* | (2010.01) |

(52) U.S. Cl.
CPC .......... *F01N 3/208* (2013.01); *F01N 3/2066* (2013.01); *F01N 3/2073* (2013.01); *F01N 11/00* (2013.01); *F01N 13/0093* (2014.06); *F01N 2560/026* (2013.01); *F01N 2560/06* (2013.01); *F01N 2560/14* (2013.01); *F01N 2570/14* (2013.01); *F01N 2610/02* (2013.01); *F01N 2610/10* (2013.01); *F01N 2610/146* (2013.01); *F01N 2610/1453* (2013.01); *F01N 2610/1486* (2013.01); *F01N 2900/1411* (2013.01); *F01N 2900/1812* (2013.01); *F01N 2900/1821* (2013.01)

(58) Field of Classification Search
USPC ................. 60/274, 286, 295, 297, 301, 303
See application file for complete search history.

(56) References Cited

U.S. PATENT DOCUMENTS

| | | | | |
|---|---|---|---|---|
| 8,037,674 | B2* | 10/2011 | Kupe ................. | B01D 53/9431 60/286 |
| 8,720,189 | B2* | 5/2014 | Ren ......................... | F01N 3/103 60/274 |
| 9,567,888 | B2* | 2/2017 | Gupta ..................... | F01N 3/208 |
| 9,790,803 | B2* | 10/2017 | Anderson ............. | F01D 5/3015 |

(Continued)

FOREIGN PATENT DOCUMENTS

| | | |
|---|---|---|
| JP | 5-49806 | 3/1993 |
| JP | 9-155164 | 6/1997 |

(Continued)

*Primary Examiner* — Binh Q Tran
(74) *Attorney, Agent, or Firm* — Finnegan, Henderson, Farabow, Garrett & Dunner, LLP

(57) ABSTRACT

In an exhaust gas control system for an internal combustion engine, addition valves which add an additive toward a first selective reduction NOx catalyst are provided in an exhaust passage on both of an upstream side and a downstream side of the SCR catalyst. In a case where a flow rate of exhaust gas flowing in the exhaust passage is equal to or lower than a predetermined flow rate, the additive is added from both addition valves to allow ammonia to be adsorbed onto the first selective reduction NOx catalyst.

6 Claims, 11 Drawing Sheets

(56) References Cited

U.S. PATENT DOCUMENTS

2015/0096287 A1\* 4/2015 Qi .......................... F01N 3/208
  60/286
2017/0087515 A1\* 3/2017 Huang ............... B01D 53/9477

FOREIGN PATENT DOCUMENTS

| JP | 2006-336588 | 12/2006 |
| JP | 2013-113267 | 6/2013 |

\* cited by examiner

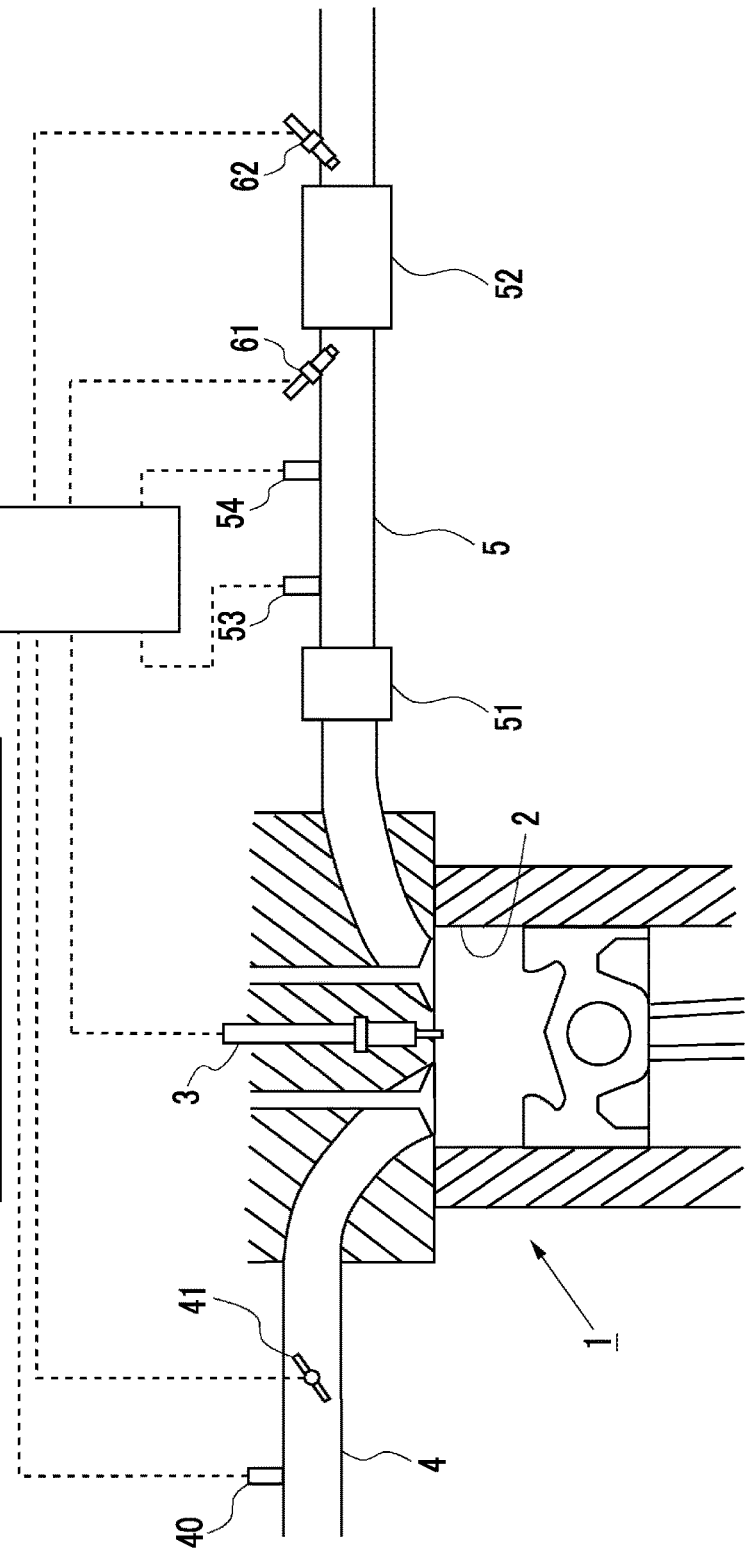

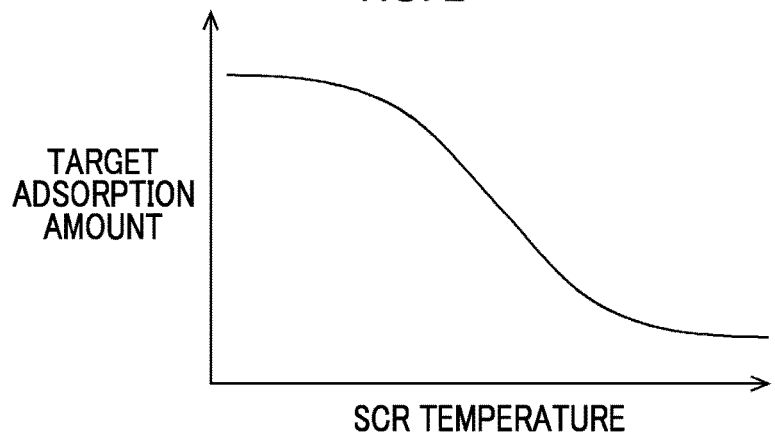
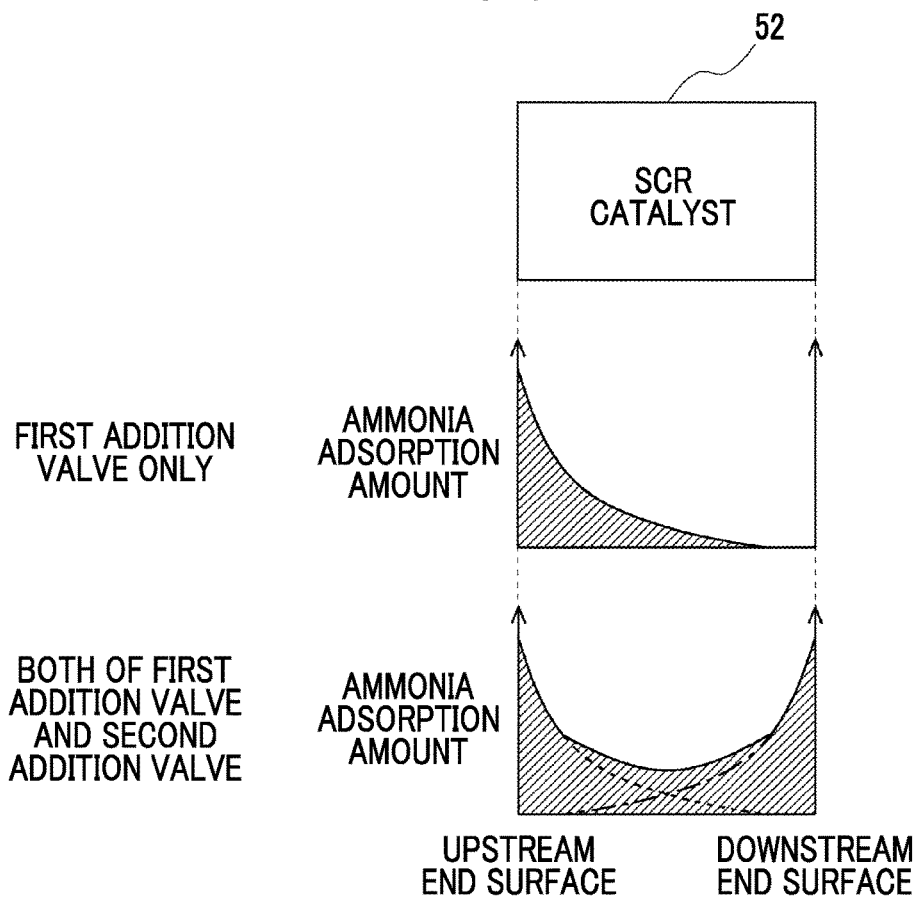

EXHAUST GAS CONTROL SYSTEM FOR INTERNAL COMBUSTION ENGINE AND CONTROL METHOD FOR INTERNAL COMBUSTION ENGINE

INCORPORATION BY REFERENCE

The disclosure of Japanese Patent Application No. 2016-141602 filed on Jul. 19, 2016 including the specification, drawings and abstract is incorporated herein by reference in its entirety.

BACKGROUND

1. Technical Field

The present disclosure relates to an exhaust gas control system for an internal combustion engine and a control method for an internal combustion engine.

2. Description of Related Art

An exhaust gas control system in which a selective reduction NOx catalyst (hereinafter, referred to as an "SCR catalyst") having a function of selectively reducing NOx in exhaust gas with ammonia as a reducing agent is provided in an exhaust passage of an internal combustion engine is known. In such an exhaust gas control system, an additive which is ammonia or a precursor of ammonia is added from an addition valve provided in the exhaust passage. With this, ammonia is adsorbed onto the SCR catalyst, and NOx in exhaust gas is reduced in the SCR catalyst with the adsorbed ammonia as the reducing agent.

Japanese Patent Application Publication No. 2013-113267 (JP 2013-113267 A) discloses an exhaust gas control system including an addition valve configured to add urea water (that is, an aqueous solution of urea as a precursor of ammonia) to the exhaust passage on an upstream side of the SCR catalyst. JP 2013-113267 A discloses a technique for adding urea water from the addition valve after operation stop of the internal combustion engine in the exhaust gas control system.

Japanese Patent Application Publication No. 2006-336588 (JP 2006-336588 A) discloses a configuration in which a reducing agent holding member, a reducing agent supply valve, and a catalyst are provided in the exhaust passage in order from an upstream side along a flow of exhaust gas. Then, in the technique disclosed in JP 2006-336588 A, a reducing agent is supplied from the reducing agent supply valve toward the reducing agent holding member, whereby the reducing agent is temporarily held by the reducing agent holding member.

SUMMARY

The disclosure provides an exhaust gas control system for an internal combustion engine and a control method for an internal combustion engine capable of allowing ammonia to be suitably adsorbed onto a selective reduction NOx catalyst in order to improve the NOx reduction ability of the selective reduction NOx catalyst provided in an exhaust passage of an internal combustion engine.

In the present disclosure, addition valves which add an additive toward the selective reduction NOx catalyst are provided in the exhaust passage on both of an upstream side and a downstream side of the selective reduction NOx catalyst. Then, in a case where a flow rate of exhaust gas flowing in the exhaust passage is equal to or lower than a predetermined flow rate, the additive is added from both addition valves to allow ammonia to be adsorbed onto the SCR catalyst.

A first aspect of the disclosure provides an exhaust gas control system for an internal combustion engine. The exhaust gas control system for an internal combustion engine includes a first selective reduction NOx catalyst, a first addition valve, a second addition valve, and an electronic control unit. The first selective reduction NOx catalyst is provided in an exhaust passage of the internal combustion engine. The first selective reduction NOx catalyst is configured to selectively reduce NOx in exhaust gas of the internal combustion engine with a reducing agent. The reducing agent is ammonia. The first addition valve is provided in the exhaust passage on an upstream side of the first selective reduction NOx catalyst in an exhaust gas flow direction. The first addition valve is configured to add the additive toward an end surface on the upstream side of the first selective reduction NOx catalyst. The additive is one of the ammonia and a precursor of the ammonia. The second addition valve is provided in the exhaust passage on a downstream side of the first selective reduction NOx catalyst in the exhaust gas flow direction. The second addition valve is configured to add the additive being one of the ammonia and the precursor of the ammonia toward an end surface on the downstream side of the first selective reduction NOx catalyst. The electronic control unit is configured to control addition of the additive from the first addition valve and addition of the additive from the second addition valve. As a result of the electronic control unit determining a flow rate of the exhaust gas flowing in the exhaust passage is equal to or lower than a predetermined flow rate when the ammonia is to be adsorbed onto the first selective reduction NOx catalyst, the electronic control unit is configured to allow the additive to be added from both of the first addition valve and the second addition valve.

The exhaust gas control system is configured such that the first addition valve provided on the upstream side of the first selective reduction NOx catalyst (hereinafter, referred to as a "first SCR catalyst") adds the additive toward the end surface on the upstream side of the first SCR catalyst, and the second addition valve provided on the downstream side of the first SCR catalyst adds the additive toward the end surface on the downstream side of the first SCR catalyst. With such a configuration, even in a state in which exhaust gas does not flow in the exhaust passage, the additive added from each addition valve reaches the first SCR catalyst.

However, in a state in which exhaust gas flows in the exhaust passage, the higher the flow rate of exhaust gas, the more hardly the additive added from the second addition valve reaches the first SCR catalyst. The predetermined flow rate is the flow rate of exhaust gas at which it can be determined that the additive added from the second addition valve reaches the first SCR catalyst. Then, in the invention, when ammonia is to be adsorbed onto the first SCR catalyst, in a case where the flow rate of exhaust gas flowing in the exhaust passage is equal to or lower than the predetermined flow rate, the additive is added from both of the first addition valve and the second addition valve. In this case, both of the additive added from the first addition valve and the additive added from the second addition valve reach the first SCR catalyst. Then, a larger amount of ammonia (or ammonia produced from the additive added from the first addition valve) added from the first addition valve is adsorbed onto an upstream portion of the first SCR catalyst. A larger amount of ammonia (or ammonia produced from the additive added from the second addition valve) added from the second addition valve is adsorbed onto a downstream portion of the first SCR catalyst. For this reason, according to the invention, it is possible to allow ammonia to be adsorbed onto the first SCR catalyst more readily and in a wider range. As a result, it is possible to improve the NOx reduction ability of the first SCR catalyst.

In the exhaust gas control system for an internal combustion engine, the electronic control unit may be configured to determine that the flow rate of exhaust gas flowing in the exhaust passage is equal to or lower than the predetermined flow rate when the operation of the internal combustion engine is stopped. That is, when ammonia is to be adsorbed onto the first SCR catalyst in a case where the operation of the internal combustion engine is stopped, the electronic control unit may be configured to allow the additive to be added from both of the first addition valve and the second addition valve. In a case where the operation of the internal combustion engine is stopped, exhaust gas does not flow in the exhaust passage. Then, as described above, if the additive is added from both of the first addition valve and the second addition valve in a state in which exhaust gas dose not flow in the exhaust passage, the additive added from both addition valves reaches the first SCR catalyst. For this reason, while the internal combustion engine is stopped, ammonia is adsorbed onto the first SCR catalyst in a wider range. With this, it is possible to improve a NOx reduction rate in the first SCR catalyst immediately after a next start of the internal combustion engine.

The exhaust gas control system for an internal combustion engine may further include a pressure regulator configured to regulate addition pressure of the additive from the second addition valve. As a result of the electronic control unit determining that the flow rate of the exhaust gas flowing in the exhaust passage is high when the electronic control unit allows the additive to be added from both of the first addition valve and the second addition valve such that ammonia is adsorbed onto the first selective reduction NOx catalyst, the pressure regulator may be configured to regulate the addition pressure of the additive from the second addition valve such that the addition pressure when the flow rate of the exhaust gas is high is higher than the addition pressure when the flow rate of the exhaust gas is low. The higher the addition pressure of the additive from the second addition valve, the more easily the additive added from the second addition valve reaches the first SCR catalyst. Accordingly, the addition pressure of the additive from the second addition valve is regulated by the pressure regulator as described above, whereby it is possible to suppress a decrease in the ratio of the additive reaching the first SCR catalyst even in a case where the flow rate of exhaust gas is relatively high. For this reason, it is possible to allow a larger amount of ammonia to be adsorbed onto the downstream portion of the first SCR catalyst.

The exhaust gas control system for an internal combustion engine may further include a second selective reduction NOx catalyst (hereinafter, referred to as a "second SCR catalyst") provided in the exhaust passage on the downstream side of the second addition valve. The second selective reduction NOx catalyst may be configured to selectively reduce NOx in the exhaust gas with the reducing agent added from the second addition valve. The pressure regulator may be configured to regulate addition pressure of the additive from the second addition valve. As a result of the electronic control unit determining that the flow rate of the exhaust gas flowing in the exhaust passage is equal to or lower than the predetermined flow rate when the electronic control unit allows the additive to be added from the second addition valve such that the ammonia is adsorbed onto the second selective reduction NOx catalyst, the pressure regulator may be configured to regulate the addition pressure such that the addition pressure when the additive is added from the second addition valve in order to add the additive to the second selective reduction NOx catalyst is lower than the addition pressure when the additive is added from the second addition valve in order to allow the ammonia to be adsorbed onto the first selective reduction NOx catalyst.

The exhaust gas control system for an internal combustion engine may further include a heater. The heater may be configured to heat the additive added from the second addition valve. As a result of the electronic control unit determining that the glow rate of the exhaust gas flowing in the exhaust passage is equal to or lower than the predetermined flow rate when the electronic control unit allows the additive to be added from the second addition valve such that the ammonia is adsorbed onto the second selective reduction NOx catalyst, the heater may be configured to heat the additive added from the second addition valve.

A second aspect of the invention provides a control method for an internal combustion engine. The internal combustion engine includes an exhaust gas control system. The exhaust gas control system includes a first selective reduction NOx catalyst provided in an exhaust passage of the internal combustion engine, a first addition valve provided in the exhaust passage on an upstream side of the first selective reduction NOx catalyst in an exhaust gas flow direction, a second addition valve provided in the exhaust passage on a downstream side of the first selective reduction NOx catalyst in the exhaust gas flow direction, and an electronic control unit configured to control addition of the additive from the first addition valve and addition of the additive from the second addition valve. The first selective reduction NOx catalyst is configured to selectively reduce NOx in the exhaust gas of the internal combustion engine with a reducing agent. The reducing agent is ammonia. The first addition valve is configured to add the additive toward an end surface on the upstream side of the first selective reduction NOx catalyst. The second addition valve may be configured to add the additive toward an end surface on the downstream side of the first selective reduction NOx catalyst. The additive is one of the ammonia and a precursor of the ammonia. The control method includes: determining, by the electronic control unit, whether or not a flow rate of the exhaust gas is equal to or lower than a predetermined flow rate; and adding the additive onto the first selective reduction NOx catalyst from both of the first addition valve and the second addition valve, as a result of the electronic control unit determining that the flow rate of the exhaust gas flowing in the exhaust passage is less than the predetermined flow rate when the electronic control unit allows the ammonia to be adsorbed onto the first selective reduction NOx catalyst.

According to the above-described configuration, when ammonia is allowed to be adsorbed onto the second SCR catalyst in a state in which the flow rate of exhaust gas flowing in the exhaust passage is equal to or lower than the predetermined flow rate, it is possible to allow a larger amount of additive added from the second addition valve to reach the second SCR catalyst. Therefore, it is possible to allow a larger amount of ammonia to be adsorbed onto the second SCR catalyst. As a result, it is possible to improve the NOx reduction rate in the second SCR catalyst.

According to the invention, it is possible to allow ammonia to be suitably adsorbed onto the SCR catalyst provided in the exhaust passage of the internal combustion engine. For this reason, it is possible to improve the NOx reduction ability of the SCR catalyst.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a diagram showing the schematic configuration of an internal combustion engine and an intake and exhaust system thereof according to Example 1;

FIG. 2 is a diagram showing the correlation between a target adsorption amount of an SCR catalyst and an SCR temperature according to the example;

FIG. 3 is a conceptual diagram showing the distribution of an ammonia adsorption amount of the SCR catalyst according to the example;

DETAILED DESCRIPTION OF EMBODIMENTS

Figure 4:
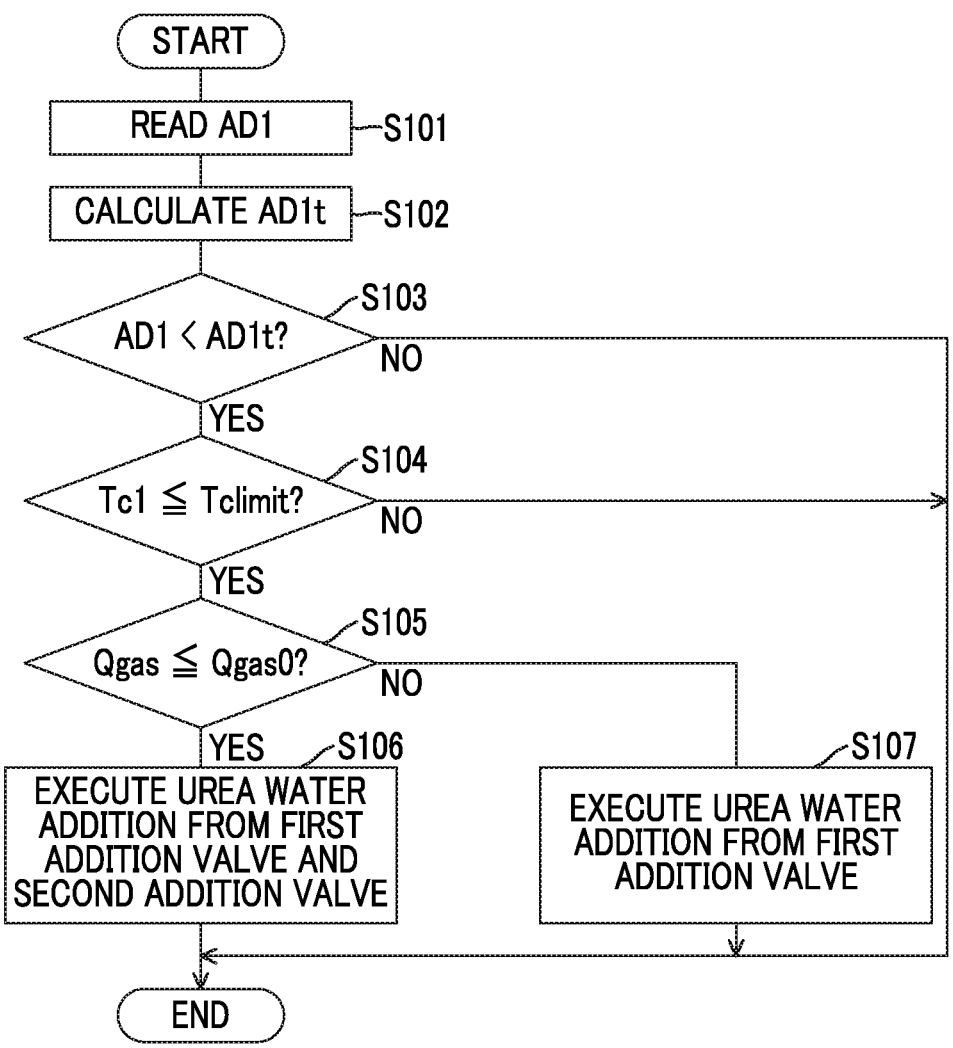
FIG. 4 is a flowchart showing a flow of urea water addition control according to Example 1.

Hereinafter, a specific embodiment of the invention will be described based on the drawings. The dimensions, materials, shapes, relative arrangements, and the like of components described in this example are not intended to limit the scope of the invention to these alone in particular as long as there are no specific statements.

Example 1

FIG. 1 is a diagram showing the schematic configuration of an internal combustion engine and an intake and exhaust system thereof according to this example. An internal combustion engine 1 shown in FIG. 1 is a compression ignition type internal combustion engine (diesel engine) which uses diesel as fuel. However, the invention can also be applied to an spark-ignition type internal combustion engine which uses gasoline or the like as fuel.

The internal combustion engine 1 includes a fuel injection valve 3 which injects fuel into a cylinder 2. In a case where the internal combustion engine 1 is a spark-ignition type internal combustion engine, the fuel injection valve 3 may be configured to inject fuel to an intake port.

The internal combustion engine 1 is connected to an intake passage 4. The intake passage 4 is provided with an air flowmeter 40 and a throttle valve 41. The air flowmeter 40 outputs an electrical signal according to the amount (mass) of intake air (air) flowing in the intake passage 4. The throttle valve 41 is disposed in the intake passage 4 on the downstream side of the air flowmeter 40. The throttle valve 41 changes a passage cross-sectional area in the intake passage 4, thereby regulating the intake air amount of the internal combustion engine 1.

The internal combustion engine 1 is connected to an exhaust passage 5. The exhaust passage 5 is provided with an oxidation catalyst 51 and an SCR catalyst 52. The oxidation catalyst 51 has a function of oxidizing HC and CO in exhaust gas. The SCR catalyst 52 has a function of reducing NOx in exhaust gas with ammonia as a reducing agent.

The exhaust passage 5 is provided with a first addition valve 61 and a second addition valve 62. The first addition valve 61 is provided in the exhaust passage 5 on the immediate upstream side of the SCR catalyst 52, and adds urea water toward an end surface on the upstream side of the SCR catalyst 52. The second addition valve 62 is provided in the exhaust passage 5 on the immediate downstream side of the SCR catalyst 52, and adds urea water toward an end surface on the downstream side of the SCR catalyst 52. That is, the first addition valve 61 and the second addition valve 62 are provided such that urea water added from the respective addition valves 61, 62 reaches the SCR catalyst 52 even in a state in which exhaust gas does not flow in the exhaust passage 5. If urea water added from the respective addition valves 61, 62 reaches the SCR catalyst 52, ammonia produced by hydrolysis of urea is adsorbed onto the SCR catalyst 52. In the SCR catalyst 52, NOx in exhaust gas is reduced with ammonia as a reducing agent.

In this example, the first addition valve 61 is an example of a "first addition valve" according to the invention, and the second addition valve 62 is an example of a "second addition valve" according to the invention. In this example, a configuration in which ammonia gas, instead of urea water, is added from the first addition valve 61 and the second addition valve 62 toward the SCR catalyst 52 may be employed.

A temperature sensor 53 and an NOx sensor 54 are provided in the exhaust passage 5 on the downstream side of the oxidation catalyst 51 and on the upstream side of the SCR catalyst 52. The temperature sensor 53 outputs an electrical signal according to a temperature of exhaust gas flowing into the SCR catalyst 52. The NOx sensor 54 outputs an electrical signal according to a NOx concentration of exhaust gas flowing into the SCR catalyst 52.

The internal combustion engine 1 is also provided with an electronic control unit (ECU) 10. The ECU 10 is a unit having a processor configured to control an operation state and the like of the internal combustion engine 1. In addition to the air flowmeter 40, the temperature sensor 53, and the NOx sensor 54 described above, various sensors, such as an ignition switch 6, an accelerator position sensor 7, and a crank position sensor 8, are electrically connected to the ECU 10. The accelerator position sensor 7 is a sensor which outputs an electrical signal corresponding to an operation amount (accelerator pedal angle) of an accelerator pedal of a vehicle, in which the internal combustion engine 1 is mounted. The crank position sensor 8 is a sensor which outputs an electrical signal corresponding to a rotation position of an engine output shaft (crankshaft) of the internal combustion engine 1. Then, output signals of these sensors are input to the ECU 10.

The ECU 10 estimates a flow rate (hereinafter, simply referred to as an "exhaust gas flow rate") of exhaust gas flowing in the exhaust passage 5 based on an output value of the air flowmeter 40. The ECU 10 estimates the temperature (hereinafter, referred to as an "SCR temperature") of the SCR catalyst 52 based on an output value of the temperature sensor 53. Various devices, such as the fuel injection valve 3, the throttle valve 41, the first addition valve 61, and the second addition valve 62 described above, are electrically connected to the ECU 10. The ECU 10 controls various devices based on the output signals of the respective sensors described above.

Next, urea water addition control according to this example will be described. As described above, in the SCR catalyst 52, NOx in exhaust gas is reduced with adsorbed ammonia as a reducing agent. The higher the SCR temperature, the smaller a maximum value (adsorption capacity) of ammonia adsorbable onto the SCR catalyst 52. For this reason, a target adsorption amount of ammonia of the SCR catalyst 52 according to the SCR temperature is determined in advance. The target adsorption amount is a value determined as a value at which a desired NOx reduction rate of the SCR catalyst 52 can be secured and the amount of ammonia desorbed from the SCR catalyst 52 can be suppressed within an allowable range. FIG. 2 is a diagram showing the correlation between the target adsorption amount of the SCR catalyst 52 and the SCR temperature. As shown in FIG. 2, the higher the SCR temperature, the smaller the target adsorption amount.

In this example, during the operation of the internal combustion engine 1, the amount of ammonia (hereinafter, simply referred to as an "ammonia adsorption amount") adsorbed onto the SCR catalyst 52 is repeatedly calculated by the ECU 10 in a predetermined cycle. In this calculation, an ammonia supply amount which is the amount of ammonia supplied to the SCR catalyst 52, an ammonia consumption amount which is the amount of ammonia consumed in reduction of NOx in the SCR catalyst 52, and an ammonia desorption amount which is the amount of ammonia desorbed from the SCR catalyst 52 are integrated, whereby a current ammonia adsorption amount is calculated. The ammonia supply amount can be calculated based on the amount of urea water added from the first addition valve 61 and the second addition valve 62. The ammonia consumption amount can be calculated based on the NOx concentration (that is, the NOx concentration of exhaust gas flowing into the SCR catalyst 52) of exhaust gas detected by the NOx sensor 54, the exhaust gas flow rate, the SCR temperature, and the ammonia adsorption amount (hereinafter, referred to as an "adsorption amount previous value") in the SCR catalyst 52 calculated in previous calculation. That is, the NOx reduction rate in the SCR catalyst 52 at the present time can be estimated based on the exhaust gas flow rate, the SCR temperature, and the adsorption amount previous value. In addition, the amount of NOx flowing into the SCR catalyst 52 can be estimated based on the NOx concentration flowing into the SCR catalyst 52 and the exhaust gas flow rate. Then, the ammonia consumption amount can be calculated on these estimation values. The ammonia desorption amount can be calculated based on the SCR temperature and the adsorption amount previous value. Then, the ammonia supply amount as an increase amount is added to the adsorption amount previous value, and the ammonia consumption amount and the ammonia desorption amount as a decrease amount are subtracted from the adsorption amount previous value, whereby a present ammonia adsorption amount (current ammonia adsorption amount).

Then, in this example, the ECU 10 controls urea water addition from the first addition valve 61 and the second addition valve 62 in order to maintain or regulate the ammonia adsorption amount of the SCR catalyst 52 calculated as described above to the target adsorption amount.

For example, in a case where the temperature of exhaust gas decreases with transition of the operation state of the internal combustion engine 1 from high-load operation to low-load operation, and accordingly, the temperature of the SCR catalyst 52 decreases, the target adsorption amount of the SCR catalyst 52 increases. In such a case, it is necessary to rapidly increase the ammonia adsorption amount of the SCR catalyst 52. In this example, it is possible to supply ammonia to the SCR catalyst 52 by adding urea water from the second addition valve 62 as well as the first addition valve 61. However, in a state in which exhaust gas flows in the exhaust passage 5, urea water is added from the second addition valve 62 from the upstream side toward the downstream side along the flow of exhaust gas. For this reason, the higher the exhaust gas flow rate, the more hardly urea water added from the second addition valve 62 reaches the SCR catalyst 52.

Accordingly, in this example, it is determined whether to add urea water only from the first addition valve 61 or to add urea water from both of the first addition valve 61 and the second addition valve 62 based on the exhaust gas flow rate. That is, when ammonia is to be adsorbed onto the SCR catalyst 52, in a case where the exhaust gas flow rate is higher than a predetermined flow rate, urea water is added only from the first addition valve 61. When ammonia is to be adsorbed onto the SCR catalyst 52, in a case where the exhaust gas flow rate is equal to or lower than the predetermined flow rate, urea water is added from both of the first addition valve 61 and the second addition valve 62. The predetermined flow rate is an exhaust gas flow rate at which it can be determined that urea water added from the second addition valve 62 reaches the SCR catalyst 52. The predetermined flow rate is determined in advance based on an experiment or the like.

According to the above description, in a case where the exhaust gas flow rate is equal to or lower than the predetermined flow rate, both of urea water added from the first addition valve 61 and urea water added from the second addition valve 62 reach the SCR catalyst 52. FIG. 3 is a conceptual diagram showing the distribution of the ammonia adsorption amount of the SCR catalyst 52. FIG. 3 shows the distribution in a case where urea water is supplied to the SCR catalyst 52 only from the first addition valve 61 and the distribution in a case where urea water is supplied to the SCR catalyst 52 from both of the first addition valve 61 and the second addition valve 62. In FIG. 3, a solid line represents the ammonia adsorption amount at each position of the SCR catalyst 52 in the exhaust gas flow direction. In the distribution shown in FIG. 3 in a case where urea water is supplied from both of the first addition valve 61 and the second addition valve 62, a broken line represents the adsorption amount of ammonia produced from urea water added from the first addition valve 61, and a one-dot-chain line represents the adsorption amount of ammonia produced from urea water added from the second addition valve 62.

As shown in FIG. 3, if urea water is supplied to the SCR catalyst 52 from both of the first addition valve 61 and the second addition valve 62, a larger amount of ammonia is adsorbed onto the SCR catalyst 52 compared to a case where urea water is supplied only from the first addition valve 61. In the distribution shown in FIG. 3 in a case where urea water is supplied from both of the first addition valve 61 and the second addition valve 62, a larger amount of ammonia produced from urea water added from the first addition valve 61 is adsorbed onto the upstream portion of the SCR catalyst 52. A larger amount of ammonia produced from urea water added from the second addition valve 62 is adsorbed onto the downstream portion of the SCR catalyst 52. Accordingly, in a case where the exhaust gas flow rate is equal to or lower than the predetermined flow rate, urea water is added from both of the first addition valve 61 and the second addition valve 62, whereby it is possible to allow ammonia to be adsorbed onto the SCR catalyst 52 more readily and in a wider angle. As a result, it is possible to improve the NOx reduction ability of the SCR catalyst 52.

Next, the flow of the urea water addition control according to this example will be described based on FIG. 4. FIG. 4 is a flowchart showing the flow of the urea water addition control according to this example. This flow is stored in advance in the ECU 10, and is repeatedly executed by the ECU 10 at a predetermined interval.

In this flow, first, in S101, an ammonia adsorption amount AD1 of the SCR catalyst 52 is read. As described above, in this example, during the operation of the internal combustion engine 1, the ammonia adsorption amount AD1 of the SCR catalyst 52 is cyclically calculated by the ECU 10. Then, the ammonia adsorption amount AD1 of the SCR catalyst 52 stored in the ECU 10 is updated for each calculation. In S101, the ammonia adsorption amount AD1 stored in the ECU 10 is read.

Next, in S102, a target adsorption amount AD1t is calculated based on a current SCR temperature. In the ECU 10, the correlation between the SCR temperature and the target adsorption amount shown in FIG. 2 is stored in the form of a map or a function. In S102, the SCR temperature estimated based on the output value of the temperature sensor 53 is substituted into the map or the function to calculate the target adsorption amount AD1t.

Next, in S103, it is determined whether or not the ammonia adsorption amount AD1 read in S101 is smaller than the target adsorption amount AD1t calculated in S102. In a case where the determination in S103 is negative, it can be determined that urea water does not need to be supplied to the SCR catalyst 52 at the present time. In this case, the execution of this flow ends once. In a case where the determination in S103 is affirmative, next, in S104, it is determined whether or not an SCR temperature Tc1 is equal to or lower than a predetermined upper limit temperature Tclimit. If ammonia is oxidized in the SCR catalyst 52, NOx is produced. The upper limit temperature Tclimit is an upper limit value of a temperature range in which the oxidation rate of ammonia in the SCR catalyst 52 is within an allowable range. Such an upper limit temperature Tclimit is determined in advance based on an experiment or the like. In a case where the determination in S104 is negative, it can be determined that urea water is not to be supplied to the SCR catalyst 52 at the present time. In this case, the execution of this flow ends once.

In a case where the determination in S104 is affirmative, it can be determined that ammonia is to be adsorbed onto the SCR catalyst 52. In this case, next, in S105, it is determined whether or not an exhaust gas flow rate Qgas is equal to or less than a predetermined flow rate Qgas0. In a case where the determination in S105 is negative, next, in S107, urea water is added only from the first addition valve 61. In a case where the determination in S106 is affirmative, next, in S107, urea water is added from both of the first addition valve 61 and the second addition valve 62. Then, after the processing of S104 or the processing of S105 is executed, the execution of this flow ends once.

According to the above-described flow, when ammonia is to be adsorbed onto the SCR catalyst 52, in a case where the exhaust gas flow rate Qgas is equal to or lower than the predetermined flow rate Qgas0, urea water is supplied to the SCR catalyst 52 from both of the first addition valve 61 and the second addition valve 62. With this, it is possible to allow ammonia to be adsorbed onto the SCR catalyst 52 more readily and in a wider range.

Example 2

The schematic configuration of an internal combustion engine and an intake and exhaust system thereof according to this example is the same as that in Example 1. Hereinafter, urea water addition control according to this example will be described. Immediately after the start of the internal combustion engine 1, there is a case where it takes a certain amount of time until the ammonia adsorption amount of the SCR catalyst 52 reaches the target adsorption amount. In particular, when the operation state of the internal combustion engine 1 is high-load operation and the SCR temperature is high, in a case where the operation of the internal combustion engine 1 is stopped, the operation of the internal combustion engine 1 is stopped in a state in which the ammonia adsorption amount of the SCR catalyst 52 is small. When such a state is brought, in a case where the internal combustion engine 1 is cold-started, since the SCR temperature is low, the ammonia adsorption amount of the SCR catalyst 52 is smaller than the target adsorption amount according to the SCR temperature, and a state in which the difference therebetween is large is generated. If such a state is generated, immediately after the start of the internal combustion engine 1, there is a concern that it is difficult to secure a desired NOx reduction rate of the SCR catalyst 52.

Accordingly, in this example, ammonia is adsorbed onto the SCR catalyst 52 after operation stop of the internal combustion engine 1. According to this, immediately after the next start of the internal combustion engine 1, ammonia adsorbed onto the SCR catalyst 52 during the operation stop of the internal combustion engine 1 is used for reduction of NOx in the SCR catalyst 52. For this reason, it is possible to improve the NOx reduction rate in the SCR catalyst 52 immediately after the next start of the internal combustion engine 1.

After the operation stop of the internal combustion engine 1, the exhaust gas flow rate becomes zero. For this reason, after the operation stop of the internal combustion engine 1, not only urea water added from the first addition valve 61 but also urea water added from the second addition valve 62 reach the SCR catalyst 52. Accordingly, in this example, when ammonia is to be adsorbed onto the SCR catalyst 52 after the operation stop of the internal combustion engine 1, urea water is added from both of the first addition valve 61 and the second addition valve 62. According to this, after the operation stop of the internal combustion engine 1, it is possible to allow ammonia to be adsorbed onto the SCR catalyst 52 in a wider range. As a result, it is possible to improve the NOx reduction ability of the SCR catalyst 52 immediately after the next start of the internal combustion engine 1.

Figure 5:
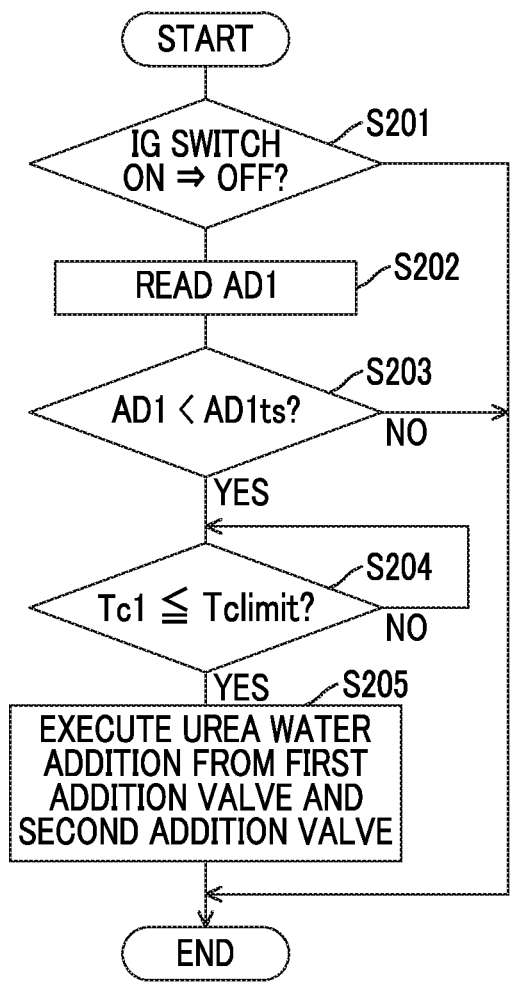
FIG. 5 is a flowchart showing a flow of urea water addition control immediately after operation stop of an internal combustion engine according to Example 2.

Next, the flow of the urea water addition control after the operation stop of the internal combustion engine 1 according to this example will be described based on FIG. 5. FIG. 5 is a flowchart showing the flow which is executed at the time of the operation stop of the internal combustion engine 1. This flow is stored in advance in the ECU 10, and is executed by the ECU 10.

In this flow, first, in S201, it is determined whether or not the ignition switch 6 is changed from ON to OFF, that is, whether or not the operation of the internal combustion engine 1 is stopped. In a case where the determination in S201 is negative, the execution of this flow ends once. In a case where the determination in S201 is affirmative, next, in S202, the ammonia adsorption amount AD1 of the SCR catalyst 52 is read. That is, in S202, the ammonia adsorption amount AD1 at the time of the operation stop of the internal combustion engine 1 is read.

Next, in S203, it is determined whether or not the ammonia adsorption amount AD1 of the SCR catalyst 52 read in S201 is smaller than a target adsorption amount AD1$ts$ at the time of the start of the internal combustion engine 1. It is considered that the target adsorption amount AD1$ts$ at the time of the start of the internal combustion engine 1 is the adsorption amount of the ammonia required for sufficiently reducing NOx in the SCR catalyst 52 immediately after the start of the internal combustion engine 1. Such a target adsorption amount AD1$ts$ at the time of the start of the internal combustion engine 1 is determined in advance based on an experiment or the like and stored in the ECU 10. In a case where the determination in S203 is negative, it can be determined that urea water does not need to be supplied to the SCR catalyst 52 after the operation stop of the internal combustion engine 1 (that is, during the operation stop of the internal combustion engine 1). In this case, the execution of this flow ends once.

In a case where the determination in S203 is affirmative, next, in S204, it is determined whether or not the SCR temperature Tc1 is equal to or lower than the predetermined upper limit temperature Tclimit. As in Example 1, the upper limit temperature Tclimit is an upper limit value of a temperature range in which an oxidation rate of ammonia in the SCR catalyst 52 is within an allowable range. As in a case where the operation state immediately before the operation stop of the internal combustion engine 1 is high-load operation, in a case where the SCR temperature is high immediately after the operation stop of the internal combustion engine 1, the temperature may be higher than the upper limit temperature Tclimit. However, even in such a case, the SCR temperature gradually decreases with time from the operation stop of the internal combustion engine 1. Accordingly, in a case where the determination in S204 is negative, it is determined that urea water is not to be supplied to the SCR catalyst 52 at the present time, and the processing of S204 is executed again. That is, the processing of S204 is repeatedly executed until the SCR temperature decreases to be equal to or lower than the upper limit temperature Tclimit.

Then, in a case where the determination in S204 is affirmative, it can be determined that ammonia is to be adsorbed onto the SCR catalyst 52. In this case, next, in S205, urea water is added from both of the first addition valve 61 and the second addition valve 62. At this time, the total amount of the addition amounts of urea water from the first addition valve 61 and the second addition valve 62 may be determined based on the difference between the ammonia adsorption amount AD1 read in S201 and the target adsorption amount AD1$ts$ at the time of the start of the internal combustion engine 1. That is, the total amount of the addition amounts of urea water from the first addition valve 61 and the second addition valve 62 may be determined such that the ammonia adsorption amount of the SCR catalyst 52 becomes the target adsorption amount AD1$ts$. Then, after the processing of S205 is executed, the execution of this flow ends.

According to the above-described flow, when ammonia is to be adsorbed onto the SCR catalyst 52 after the operation stop of the internal combustion engine 1, urea water is supplied to the SCR catalyst 52 from both of the first addition valve 61 and the second addition valve 62. With this, it is possible to allow ammonia to be adsorbed onto the SCR catalyst 52 in a wider range after the operation stop of the internal combustion engine 1.

In this example, whether or not to execute addition of urea water from the first addition valve 61 and the second addition valve 62 after the operation stop of the internal combustion engine 1 may not be necessarily determined based on the ammonia adsorption amount AD1 of the SCR catalyst 52 at the time of the operation stop of the internal combustion engine 1. That is, after the operation stop of the internal combustion engine 1, if the condition that the SCR temperature is equal to or lower than the upper limit temperature Tclimit is established, a predetermined fixed amount of urea water may added from the first addition valve 61 and the second addition valve 62.

In this example, a case where the operation of the internal combustion engine 1 is stopped by turning off the ignition switch 6, and the internal combustion engine 1 is restarted by turning on the ignition switch 6. However, in an internal combustion engine in which so-called automatic stop and automatic start control for automatically stopping the operation of the internal combustion engine in a case where a predetermined automatic stop condition is established and then automatically restarting the internal combustion engine in a case where a predetermined automatic start condition is established is performed, in a case where the operation of the internal combustion engine is automatically stopped, the same urea water addition control as described above may be executed.

Example 3

Figure 6:
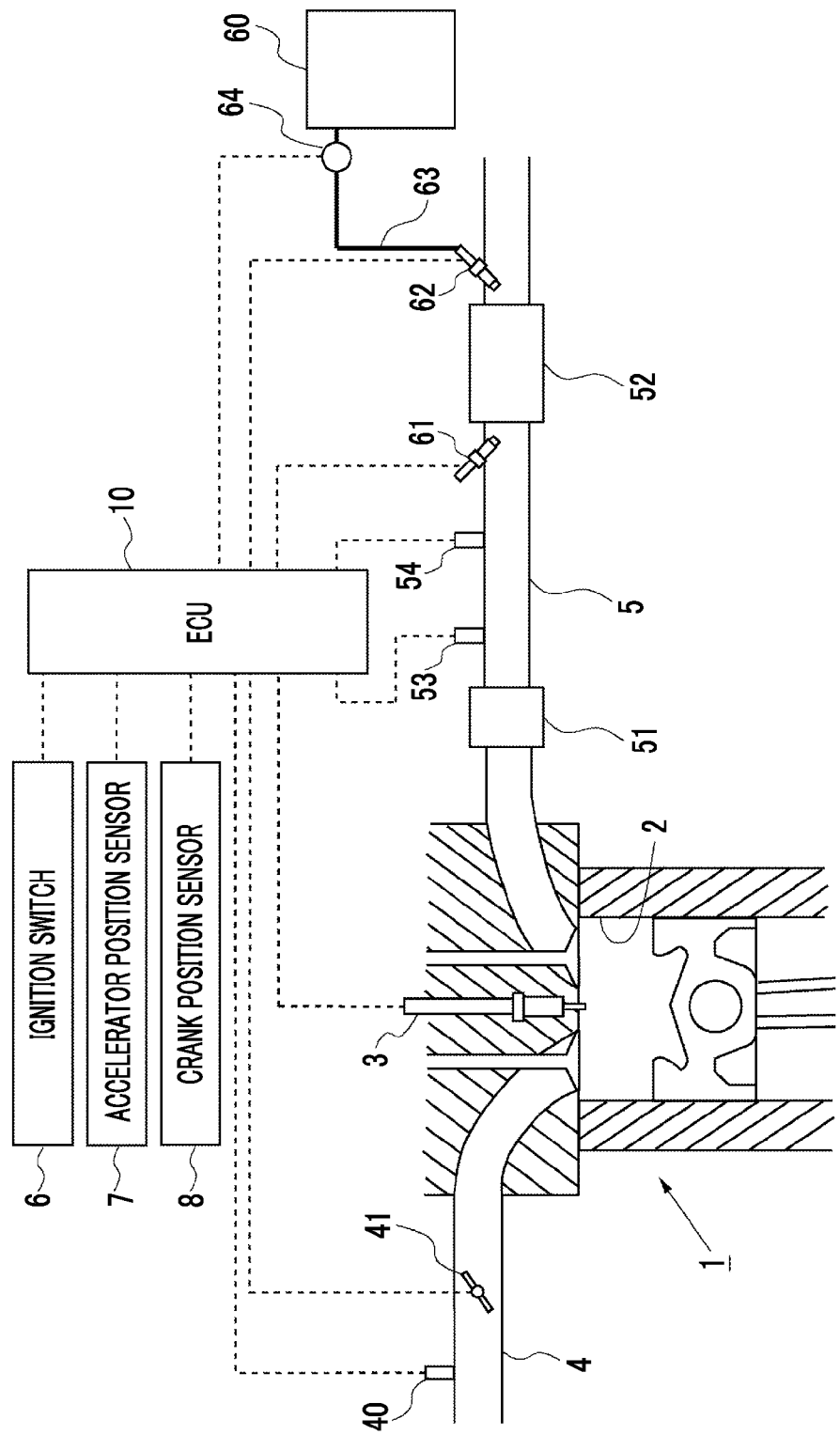
FIG. 6 is a diagram showing the schematic configuration of an internal combustion engine and an intake and exhaust system thereof according to Example 3.

FIG. 6 is a diagram showing the schematic configuration of an internal combustion engine and an intake and exhaust system thereof according to this example. In this example, a second addition valve 62 and an urea water tank 60 communicate with each other through an urea water passage 63. The urea water passage 63 is provided with an electric pump 64. Then, the electric pump 64 is operated, whereby urea water is supplied from the urea water tank 60 to the second addition valve 62 through the urea water passage 63. A rotation speed of the electric pump 64 is regulated to change an ejection amount of urea water, thereby regulating addition pressure of urea water from the second addition valve 62. The electric pump 64 is electrically connected to the ECU 10, and is controlled by the ECU 10. Other configurations are the same as those in Example 1, and thus, description thereof will not be repeated. In this example, the electric pump 64 is an example of a "pressure regulator" according to the invention.

Like the urea water addition control according to Example 1, in this example, when ammonia is to be adsorbed onto the SCR catalyst 52, in a case where the exhaust gas flow rate is equal to or lower than the predetermined flow rate, urea water is added from both of the first addition valve 61 and the second addition valve 62. At this time, in this example, the addition pressure of urea water from the second addition valve 62 is regulated based on the exhaust gas flow rate. That is, when the exhaust gas flow rate is high, the rotation speed of the electric pump 64 is set to be higher than when the exhaust gas flow rate is low. With this, when the exhaust gas flow rate is high, the addition pressure of urea water from the second addition valve 62 is set to be higher than when the exhaust gas flow rate is low.

The higher the addition pressure of urea water from the second addition valve 62, the more easily urea water added from the second addition valve 62 reaches the SCR catalyst 52. Accordingly, the addition pressure of urea water from the second addition valve 62 is regulated as described above, whereby it is possible to suppress a decrease in the ratio of urea water reaching the SCR catalyst 52 out of urea water added from the second addition valve 62 even in a case where the exhaust gas flow rate is relatively high. For this reason, it is possible to allow a larger amount of ammonia onto the downstream portion of the SCR catalyst 52. As a result, it is possible to further increase the NOx reduction rate of the SCR catalyst 52.

Figure 7:
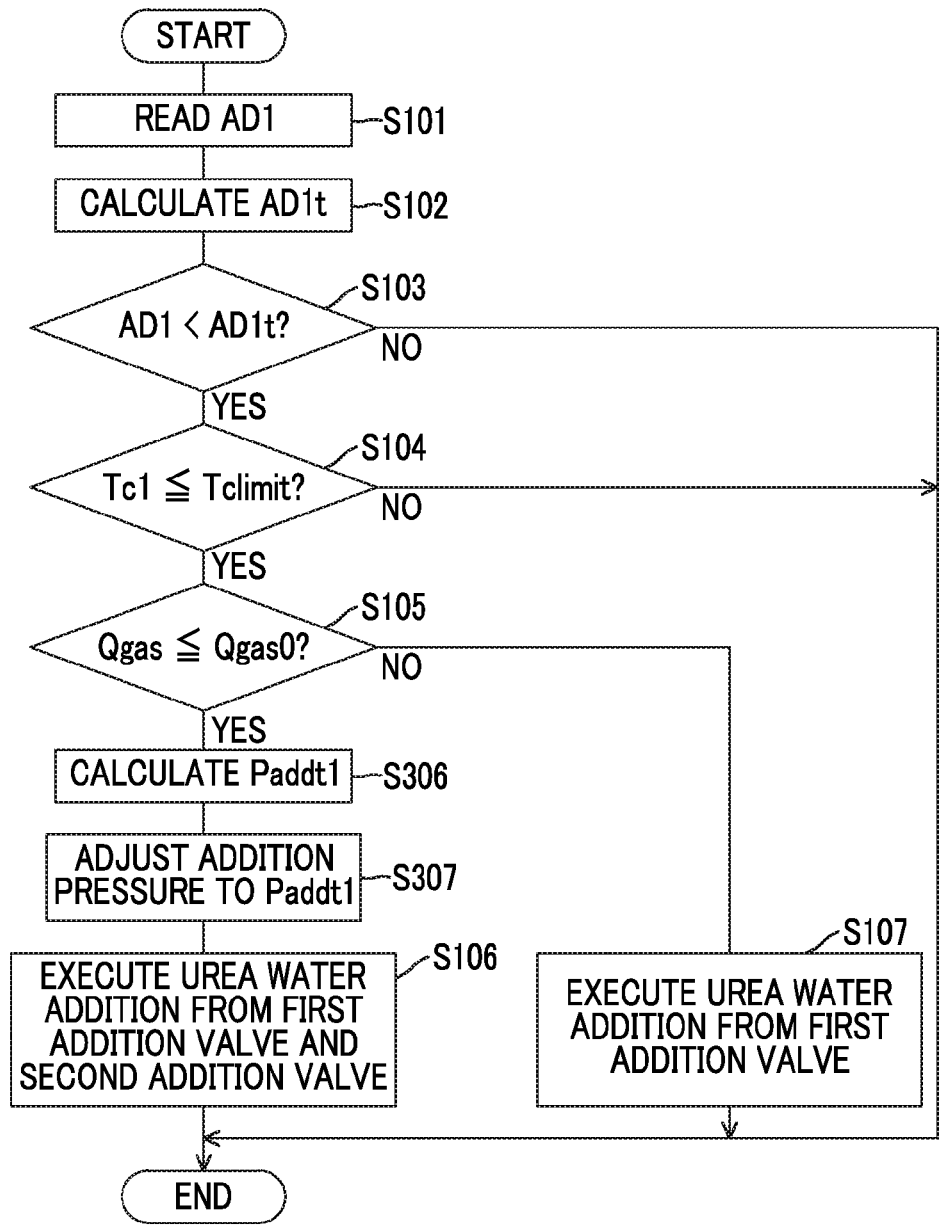
FIG. 7 is a flowchart showing a flow of urea water addition control according to Example 3.

Next, the flow of the urea water addition control according to this example will be described based on FIG. 7. FIG. 7 is a flowchart showing the flow of the urea water addition control according to this example. This flow is stored in advance in the ECU 10, and is repeatedly executed by the ECU 10 at a predetermined interval. Since the processing which is executed in the steps other than S306 and S307 in this flow is the same as the processing which is executed in each step in the flow shown in FIG. 4, the steps in which the same processing is executed are represented by the same reference numbers, and description thereof will not be repeated.

Figure 8:
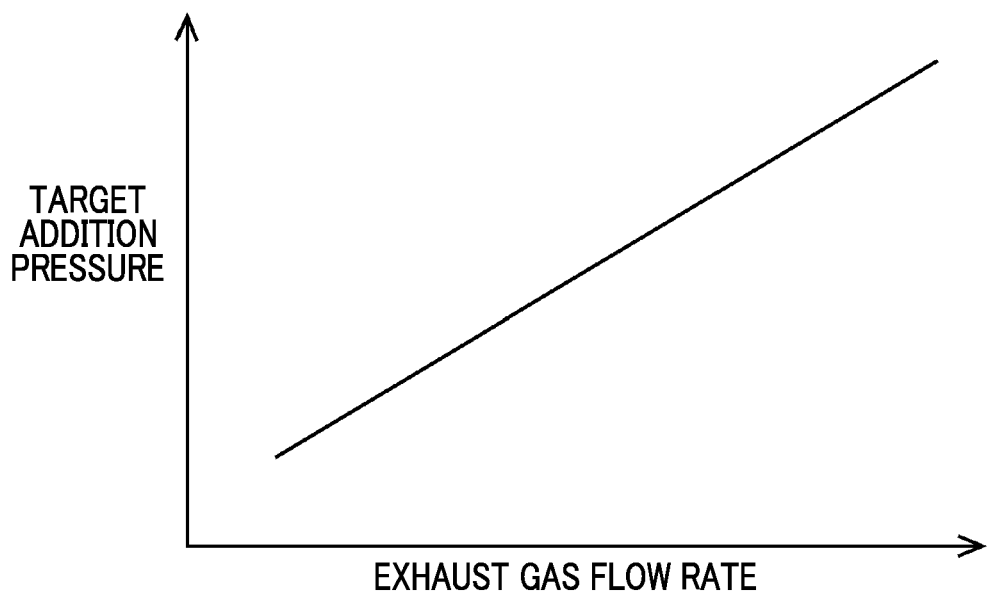
FIG. 8 is a diagram showing the correlation between target addition pressure and an exhaust gas flow rate according to Example 3.

In this flow, if the determination in S105 is affirmative, next, processing of S306 is executed. In S306, a target addition pressure Paddt1 which is a target value of the addition pressure of urea water from the second addition valve 62 is calculated. The target addition pressure Paddt1 is calculated based on a current exhaust gas flow rate. FIG. 8 is a diagram showing the correlation between the target addition pressure and the exhaust gas flow rate. As shown in FIG. 8, the higher the exhaust gas flow rate, the higher the target addition pressure. The target addition pressure is not necessarily changed consecutively with respect to the exhaust gas flow rate, and the target addition pressure may be changed in a stepwise manner with respect to the exhaust gas flow rate. In this example, the correlation between the target addition pressure and the exhaust gas flow rate shown in FIG. 8 is stored in advance in the ECU 10 in the form of a map or a function. In S306, the exhaust gas flow rate estimated based on the output value of the air flowmeter 40 is substituted into the map or the function to calculate the target addition pressure Paddt1.

Next, in S307, the rotation speed of the electric pump 64 is regulated such that the addition pressure of urea water from the second addition valve 62 becomes the target addition pressure Paddt1 calculated in S306. Next, the processing of S106 is executed.

According to the above-described flow, in a case where urea water is added from both of the first addition valve 61 and the second addition valve 62 in order to allow ammonia to be adsorbed onto the SCR catalyst 52, the higher the exhaust gas flow rate Qgas, the higher the addition pressure of urea water from the second addition valve 62. With this, it is possible to allow a larger amount of ammonia onto the downstream portion of the SCR catalyst 52.

Example 4

Figure 9:
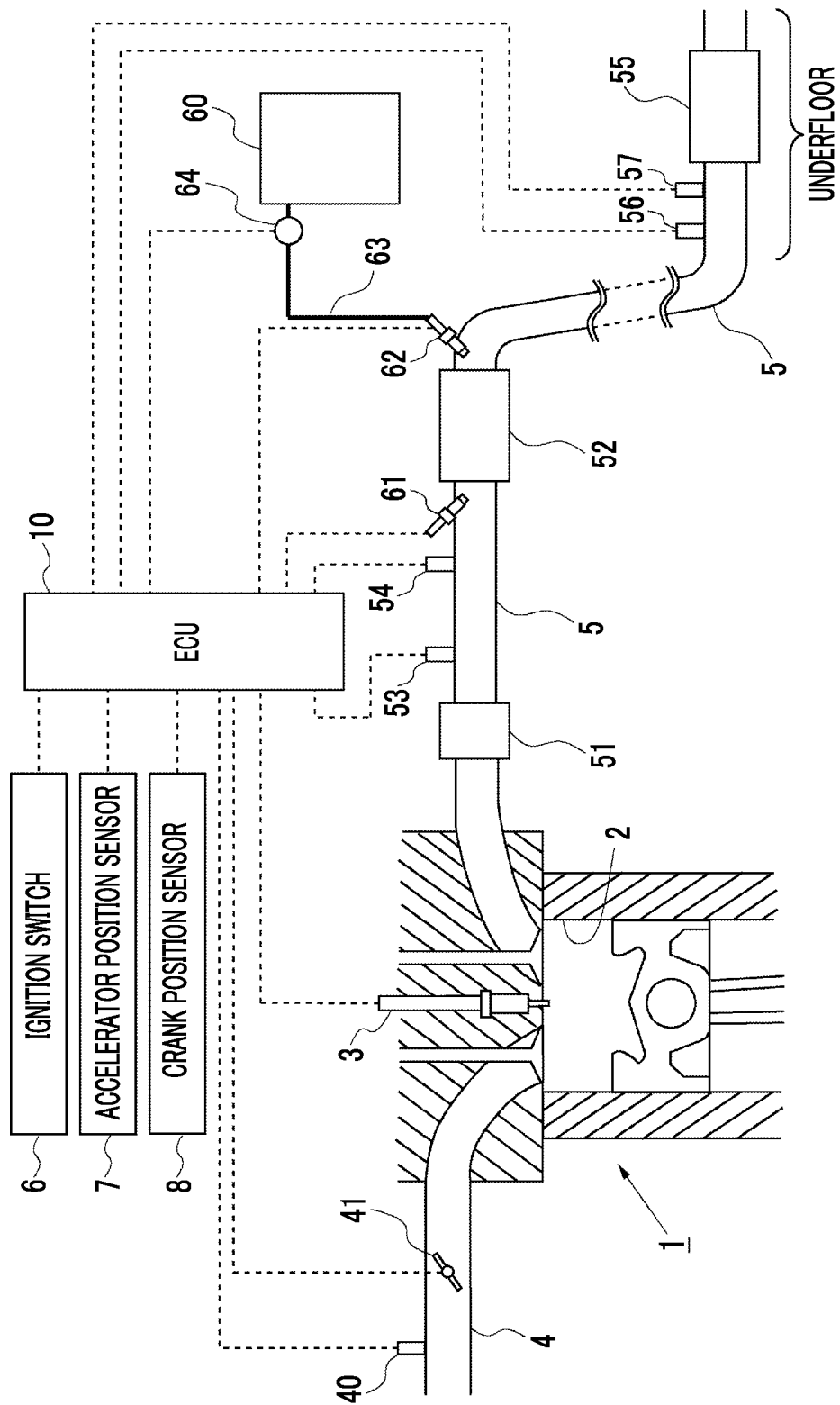
FIG. 9 is a diagram showing the schematic configuration of an internal combustion engine and an intake and exhaust system thereof according to Example 4.

FIG. 9 is a diagram showing the schematic configuration of an internal combustion engine and an intake and exhaust system thereof according to this example. In this example, the oxidation catalyst 51, the SCR catalyst 52, the first addition valve 61, the second addition valve 62, the temperature sensor 53, and the NOx sensor 54 are provided in the exhaust passage 5 inside an engine room of a vehicle, in which the internal combustion engine 1 is mounted. Then, in this example, the SCR catalyst 52 is referred to as a first SCR catalyst 52, the temperature sensor 53 is referred to as an upstream temperature sensor 53, and the NOx sensor 54 is referred to as an upstream NOx sensor 54. In this example, the exhaust passage 5 is bent toward an underfloor of the vehicle in an immediate downstream portion of the SCR catalyst 52, and the second addition valve 62 is disposed in the bent portion.

In a portion of the exhaust passage 5 positioned on the underfloor, a second SCR catalyst 55, a downstream temperature sensor 56, and a downstream NOx sensor 57 are provided. Like the first SCR catalyst 52, the second SCR catalyst 55 has a function of reducing NOx in exhaust gas with ammonia as a reducing agent. The downstream temperature sensor 56 and the downstream NOx sensor 57 are provided in the exhaust passage 5 on an upstream side of the second SCR catalyst 55. The downstream temperature sensor 56 outputs an electrical signal according to a temperature of exhaust gas flowing into the second SCR catalyst 55. The downstream NOx sensor 57 outputs an electrical signal according to a NOx concentration of exhaust gas flowing into the second SCR catalyst 55. The downstream temperature sensor 56 and the downstream NOx sensor 57 are electrically connected to the ECU 10. The ECU 10 estimates the temperature (hereinafter, referred to as a "second SCR temperature") of the second SCR catalyst 55 based on an output value of the downstream temperature sensor 56. Configurations other than those described above are the same as those in Example 3, and thus, description thereof will not be repeated.

As described above, in a case where the first SCR catalyst 52, the first addition valve 61, and the second addition valve 62 are disposed inside the engine room, during the operation of the internal combustion engine 1 and for a while after the operation stop of the internal combustion engine 1, an atmosphere temperature of a portion of the exhaust passage 5 where these are provided is easily maintained to be high compared to a case where these are provided on the underfloor. For this reason, gasification and diffusion of urea is easily promoted when urea water is added from the first addition valve 61 and the second addition valve 62. Accordingly, ammonia is easily adsorbed onto the first SCR catalyst 52 in a wider range. However, in the invention, it is not essential that the first SCR catalyst, the first addition valve, and the second addition valve are disposed inside the engine room, and the second SCR catalyst is disposed on the underfloor.

In this example, the same urea water addition control as the urea water addition control according to Example 1 is executed. That is, when ammonia is to be adsorbed onto the first SCR catalyst 52, in a case where the exhaust gas flow rate is higher than the predetermined flow rate, urea water is added only from the first addition valve 61. When ammonia is to be adsorbed onto the first SCR catalyst 52, in a case where the exhaust gas flow rate is equal to or lower than the predetermined flow rate, urea water is added from both of the first addition valve 61 and the second addition valve 62.

In this example, even when ammonia is to be adsorbed onto the second SCR catalyst 55, urea water is added from the second addition valve 62. If urea water added from the second addition valve 62 flows toward the downstream side by exhaust gas, urea water reaches the second SCR catalyst 55. With this, ammonia is adsorbed onto the second SCR catalyst. In this example, during the operation of the internal combustion engine 1, an ammonia adsorption amount of the second SCR catalyst 55 is repeatedly calculated by the ECU 10 in a predetermined cycle. In this calculation, like the calculation of the ammonia adsorption amount of the first SCR catalyst 52 described above, an ammonia supply amount which is the amount of ammonia supplied to the second SCR catalyst 55, an ammonia consumption amount which is the amount of ammonia consumed in reduction of NOx in the second SCR catalyst 55, and an ammonia desorption amount which is the amount of ammonia desorbed from the second SCR catalyst 55 are integrated, whereby a current ammonia adsorption amount is calculated. At this time, the ammonia supply amount to the second SCR catalyst 55 is calculated in consideration of not only the amount of urea water added from the second addition valve 62 but also the amount of ammonia desorbed from the first SCR catalyst 52. The ammonia consumption amount and the ammonia desorption amount are calculated using the NOx concentration of exhaust gas detected by the downstream NOx sensor 57, the exhaust gas flow rate, and the second SCR temperature.

In this example, in order to maintain or regulate the ammonia adsorption amount of the second SCR catalyst 55 calculated as described above to the target adsorption amount, the ECU 10 controls addition of urea water from the second addition valve 62. However, as described above, even when ammonia is to be adsorbed onto the first SCR catalyst 52, urea water may be added from the second addition valve 62. That is, when ammonia is to be adsorbed onto the first SCR catalyst 52, in a case where the exhaust gas flow rate is equal to or lower than the predetermined flow rate, urea water is added from the second addition valve 62. In such a case, addition of urea water from the second addition valve 62 is controlled such that urea water is supplied to the first SCR catalyst 52 with priority over supply of urea water to the second SCR catalyst 55.

In this example, as in Example 3, the rotation speed of the electric pump 64 is regulated, thereby regulating the addition pressure of urea water from the second addition valve 62. Then, when urea water is added from the second addition valve 62 in order to allow ammonia to be adsorbed onto the first SCR catalyst 52, the addition pressure of urea water is regulated to predetermined reference addition pressure. That is, if urea water is added from the second addition valve 62 at the reference addition pressure when the exhaust gas flow rate is equal to or lower than the predetermined flow rate, added urea water reaches the first SCR catalyst 52. When urea water is added from the second addition valve 62 in order to allow ammonia to be adsorbed onto the second SCR catalyst 55, in a case where the exhaust gas flow rate is equal to or less than the predetermined flow rate, the addition pressure of urea water from the second addition valve 62 is regulated to predetermined low addition pressure lower than the reference addition pressure. The low addition pressure is addition pressure at which, even if the exhaust gas flow rate is equal to or lower than the predetermined flow rate, a comparatively large amount of urea water added from the second addition valve 62 does not reach the first SCR catalyst 52 and flows toward the downstream side by exhaust gas. That is, even if the exhaust gas flow rate is equal to or lower than the predetermined flow rate, if urea water is added from the second addition valve 62 at the low addition pressure, a large amount of added urea water reaches the second SCR catalyst 55. Such a reference addition pressure and a low addition pressure are determined in advance based on an experiment or the like and stored in the ECU 10.

As described above, the addition pressure of urea water from the second addition valve 62 is regulated, whereby, when ammonia is to be adsorbed onto the second SCR catalyst 55, in a case where the exhaust gas flow rate is equal to or lower than the predetermined flow rate, it is possible to make a larger amount of urea water added from the second addition valve 62 reach the second SCR catalyst 55. Accordingly, it is possible to allow a larger amount of ammonia onto the second SCR catalyst 55. As a result, it is possible to improve the NOx reduction rate in the second SCR catalyst 55.

Figure 10:
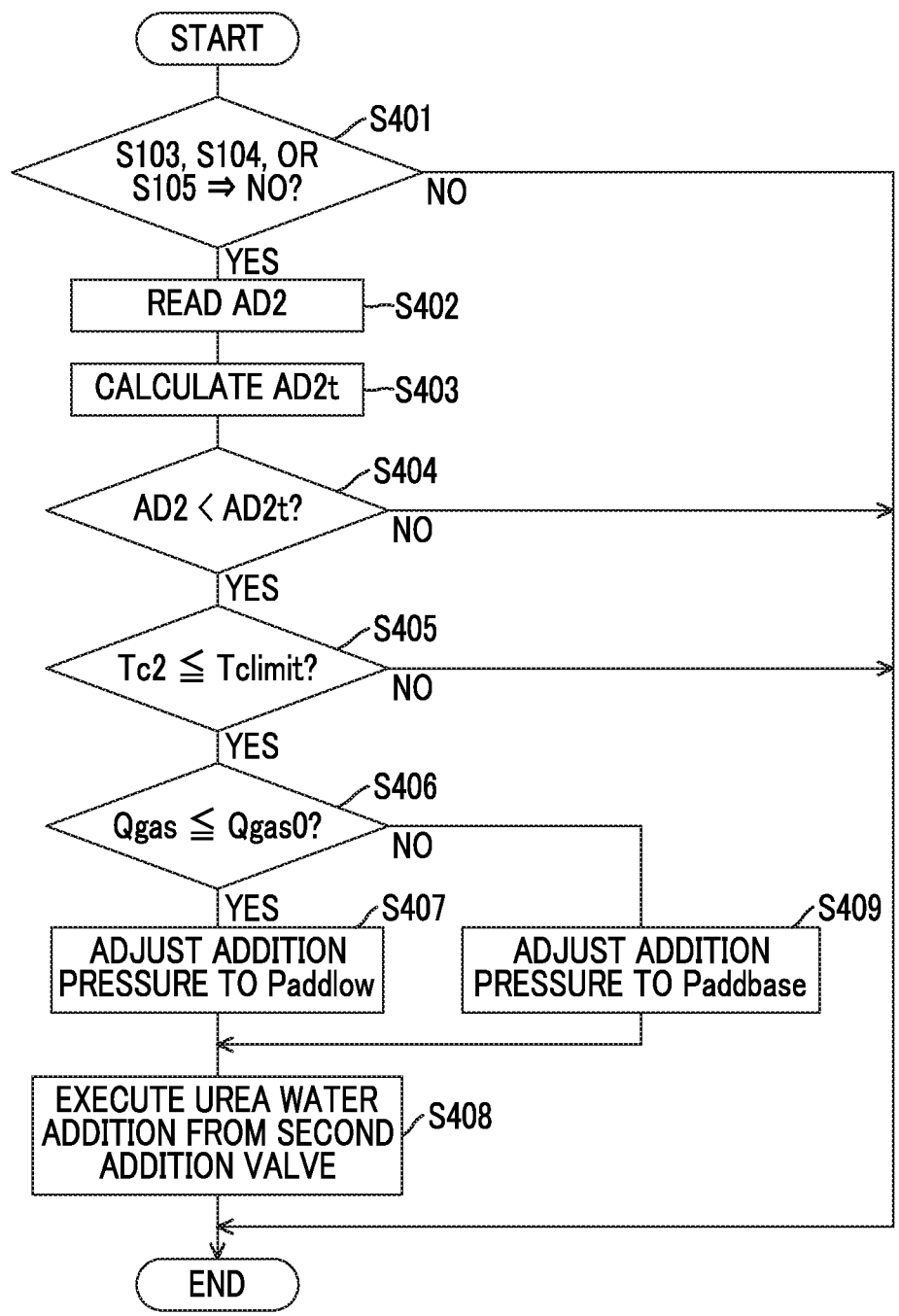
FIG. 10 is a flowchart showing a flow of urea water addition control according to Example 4.

Next, the flow of the urea water addition control according to this example will be described based on FIG. 10. FIG. 10 is a flowchart showing the flow of the urea water addition control according to this example. This flow is stored in advance in the ECU 10, and is repeatedly executed by the ECU 10 at a predetermined interval. However, this flow is a flow which is executed in order to maintain or regulate the ammonia adsorption amount of the second SCR catalyst 55 to the target adsorption amount. For this reason, even in this example, in order to maintain or regulate the ammonia adsorption amount of the first SCR catalyst 52 to the target adsorption amount, separately from this flow, the flow shown in FIG. 4 is repeatedly executed by the ECU 10 at a predetermined interval. At this time, in S106 of the flow shown in FIG. 4, when urea water is added from the second addition valve 62, the addition pressure of urea water is regulated to the reference addition pressure.

In this flow, first, in S401, it is determined whether or not the determination in S103, S104, or S105 of the flow shown in FIG. 4 is negative. As described above, in a case where the determination in S103 of the flow shown in FIG. 4 is negative, it can be determined that urea water does not need to be supplied to the first SCR catalyst 52 at the present time. In a case where the determination in S104 of the flow shown in FIG. 4 is negative, it can be determined that urea water is not to be supplied to the first SCR catalyst 52. In a case where the determination in S105 of the flow shown in FIG. 4 is negative, addition of urea water for allowing ammonia to be adsorbed onto the first SCR catalyst 52 is executed only by the first addition valve 61. Accordingly, in a case where the determination in S401 is affirmative, it can be determined that urea water does not need to be added from the second addition valve 62 in order to allow ammonia to be adsorbed onto the first SCR catalyst 52. In this case, next, processing of S402 is executed. In a case where the determination in S401 is affirmative, that is, in a case where the determination in S103, S104, and S105 of the flow shown in FIG. 4 is affirmative, in order to allow ammonia to be adsorbed onto the first SCR catalyst 52, not only addition of urea water from the first addition valve 61 but also addition of urea water from the second addition valve 62 are executed. In this case, in this example, since supply of urea water to the first SCR catalyst 52 is given priority, the execution of this flow ends once.

In S402, an ammonia adsorption amount AD2 of the second SCR catalyst 55 is read. As described above, in this example, during the operation of the internal combustion engine 1, the ammonia adsorption amount AD2 of the second SCR catalyst 55 is calculated cyclically by the ECU 10. Then, the ammonia adsorption amount AD2 of the second SCR catalyst 55 stored in the ECU 10 is updated for each calculation. In S402, the ammonia adsorption amount AD2 stored in the ECU 10 is read.

Next, in S403, a target adsorption amount AD2t of the second SCR catalyst 55 is calculated based on the current second SCR temperature. In the ECU 10, not only the correlation between the first SCR temperature and the target adsorption amount AD1t of the first SCR catalyst 52 but also the correlation between the second SCR temperature and the target adsorption amount AD2t of the second SCR catalyst 55 are stored in the form of maps or functions. The correlation between the second SCR temperature and the target adsorption amount AD2t of the second SCR catalyst 55 shows the same tendency as the correlation between the first SCR temperature and the target adsorption amount AD1t of the first SCR catalyst 52. That is, the higher the second SCR temperature, the smaller the target adsorption amount AD2t of the second SCR catalyst 55. In S403, the second SCR temperature estimated based on the output value of the downstream temperature sensor 56 is substituted into the map or the function to calculate the target adsorption amount AD2t.

Next, in S404, it is determined whether or not the ammonia adsorption amount AD2 read in S402 is smaller than the target adsorption amount AD2t calculated in S403. In a case where the determination in S404 is negative, it can be determined that urea water does not need to be supplied to the second SCR catalyst 55 at the present time. In this case, the execution of this flow ends once. In a case where the determination in S404 is affirmative, next, in S405, it is determined whether or not the second SCR temperature Tc2 is equal to or lower than the predetermined upper limit temperature Tclimit. The upper limit temperature Tclimit is an upper limit value of a temperature range in which an oxidation rate of ammonia in the second SCR catalyst 52 is within an allowable range. Such an upper limit temperature Tclimit is determined in advance based on an experiment or the like. In a case where the determination in S405 is negative, it can be determined that urea water is not to be supplied to the second SCR catalyst 55 at the present time. In this case, the execution of this flow ends once.

In a case where the determination in S405 is affirmative, it can be determined that ammonia is to be adsorbed onto the second SCR catalyst 55. In this case, next, in S406, it is determined whether or not the exhaust gas flow rate Qgas is equal to or lower than the predetermined flow rate Qgas0. In a case where the determination in S406 is affirmative, next, in S407, the rotation speed of the electric pump 64 is regulated such that the addition pressure of urea water from the second addition valve 62 becomes low addition pressure Paddlow. In a case where the determination in S406 is negative, next, in S409, the rotation speed of the electric pump 64 is regulated such that the addition pressure of urea water from the second addition valve 62 becomes reference addition pressure Paddbase. Next to S407 or S409, in S408, urea water is added from the second addition valve 62. Thereafter, the execution of this flow ends once.

According to the above-described flow, when ammonia is to be adsorbed onto the second SCR catalyst 55, in a case where the exhaust gas flow rate Qgas is equal to or lower than the predetermined flow rate Qgas0, the addition pressure of urea water from the second addition valve 62 is regulated to the low addition pressure Paddlow lower than the reference addition pressure Paddbase. With this, it is possible to allow a larger amount of ammonia to be adsorbed onto the second SCR catalyst 55.

Example 5

Figure 11:
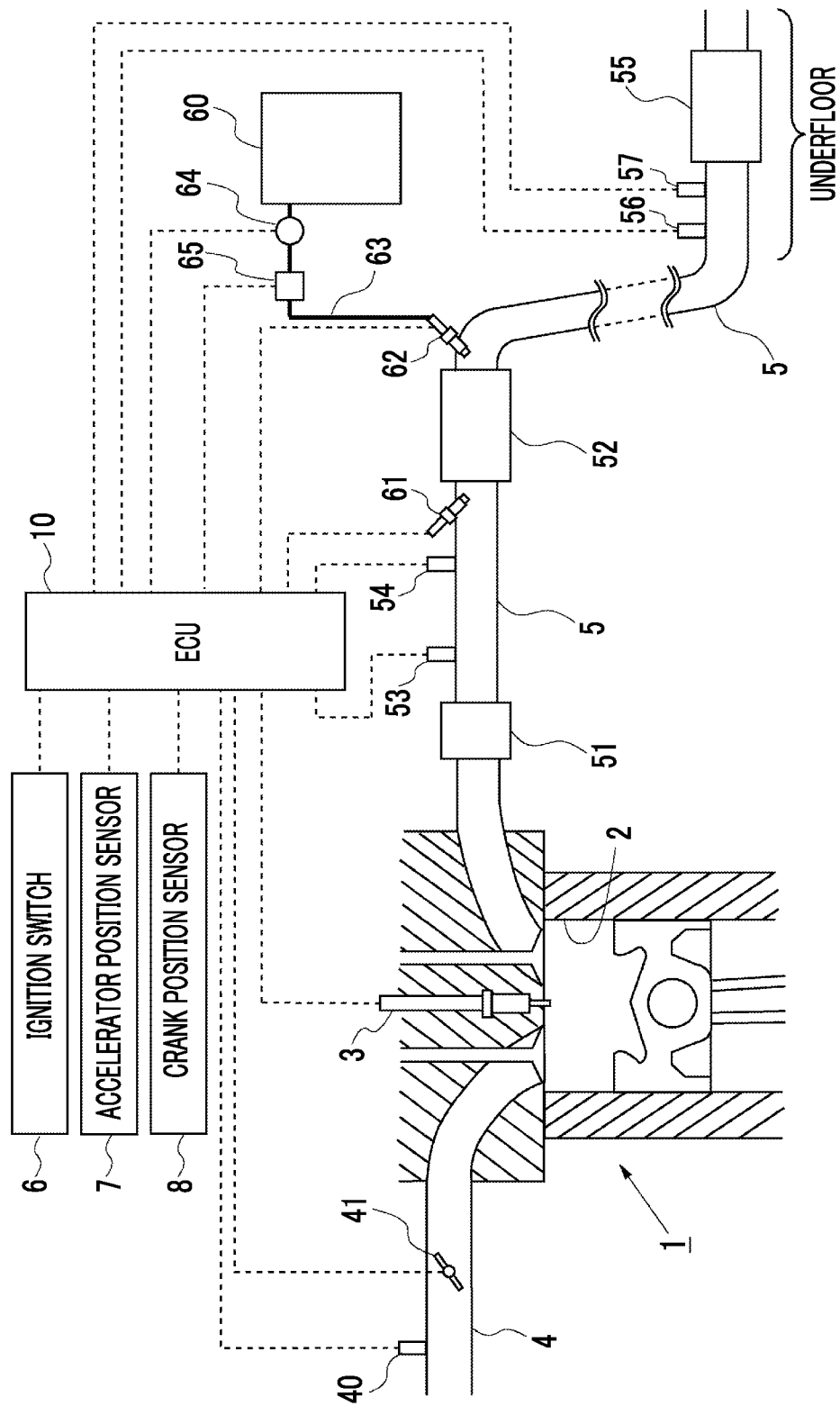
FIG. 11 is a diagram showing the schematic configuration of an internal combustion engine and an intake and exhaust system thereof according to Example 5.

FIG. 11 is a diagram showing the schematic configuration of an internal combustion engine and an intake and exhaust system thereof according to this example. The urea water passage 63 is provided with a heater 65 which heats urea water flowing in the urea water passage 63. The heater 65 is electrically connected to the ECU 10, and is controlled by the ECU 10. Configurations other than this point are the same as those in Example 4, and thus, description thereof will not be repeated.

In this example, addition pressure when urea water is added from the second addition valve 62 is always constant. That is, when the exhaust gas flow rate is equal to or lower than the predetermined flow rate, in a case where urea water is added from the second addition valve 62 in order to allow ammonia to be adsorbed onto the first SCR catalyst 52 and in a case where urea water is added from the second addition valve 62 in order to allow ammonia to be adsorbed onto the second SCR catalyst 55, the addition pressure of urea water from the second addition valve 62 is identical. In this example, in a case where urea water is added from the second addition valve 62 in order to allow ammonia to be adsorbed onto the second SCR catalyst 55 when the exhaust gas flow rate is equal to or lower than the predetermined flow rate, instead of the addition pressure control performed in the urea water addition control according to Example 4, heating control of urea water is performed. That is, in a case where urea water is added from the second addition valve 62 in order to allow ammonia to be adsorbed onto the second SCR catalyst 55 when the exhaust gas flow rate is equal to or lower than the predetermined flow rate, urea water added from the second addition valve 62 is heated by the heater 65.

If urea water is heated by the heater 65, gasification of urea water is easily promoted when urea water is added from the second addition valve 62. With this, urea water added from the second addition valve 62 more easily flows toward the downstream side by exhaust gas. For this reason, a larger amount of urea reaches the second SCR catalyst 55. Accordingly, like in a case where the addition pressure control is performed in the urea water addition control according to Example 4, it is possible to allow a larger amount of ammonia to be adsorbed onto the second SCR catalyst 55. As a result, it is possible to improve the NOx reduction rate in the second SCR catalyst 55.

Figure 12:
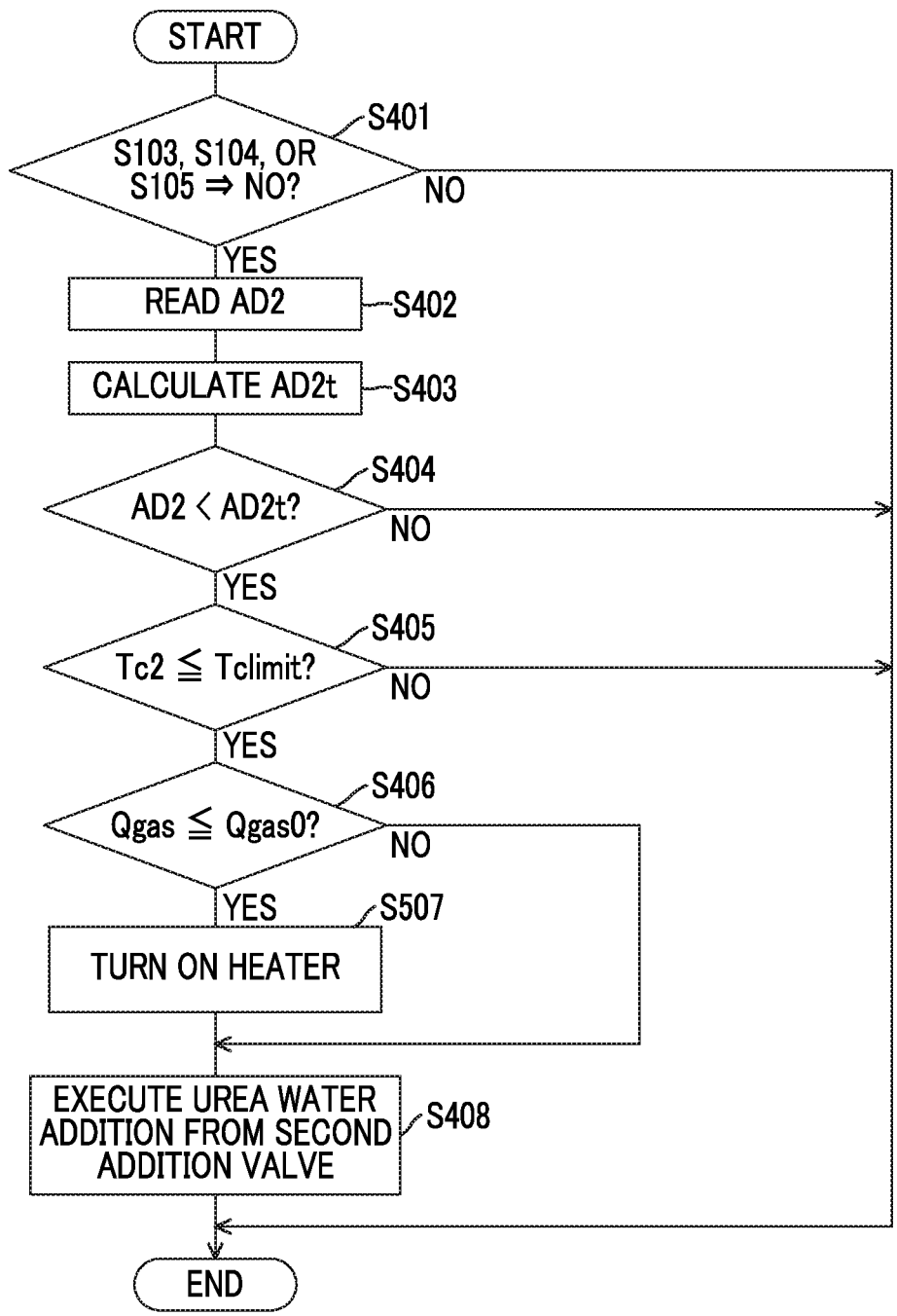
FIG. 12 is a flowchart showing a flow of urea water addition control according to Example 5.

Next, the flow of the urea water addition control according to this example will be described based on FIG. 12. FIG. 12 is a flowchart showing the flow of the urea water addition control according to this example. This flow is stored in advance in ECU 10, and is repeatedly executed by the ECU 10 at a predetermined interval. As in Example 4, even in this example, in order to maintain or regulate the ammonia adsorption amount of the first SCR catalyst 52 to the target adsorption amount, separately from this flow, the flow shown in FIG. 4 is repeatedly executed by the ECU 10 at a predetermined interval. Since the processing which is executed in S401 to S406, and S408 of this flow is the same as the processing which is executed in each step in the flow shown in FIG. 10, the steps in which the same processing is executed are represented by the same reference numbers, and description thereof will not be repeated.

In this flow, in a case where the determination in S406 is affirmative, next, in S507, the heater 65 is turned on. With this, urea water added from the second addition valve 62 is heated. Next, in S408, urea water is added from the second addition valve 62. In a case where the determination in S406 is negative, next, the processing of S408 is executed. That is, urea water is not heated by the heater 65, and addition of urea water from the second addition valve 62 is executed.

According to the above-described flow, when ammonia is to be adsorbed onto the second SCR catalyst 55, in a case where the exhaust gas flow rate Qgas is equal to or lower than the predetermined flow rate Qgas0, urea water added from the second addition valve 62 is heated. With this, it is possible to allow a larger amount of ammonia to be adsorbed onto the second SCR catalyst 55.

The urea water addition control according to Example 4 and the heating control of urea water according to this example may be used in combination.

What is claimed is:

1. An exhaust gas control system for an internal combustion engine comprising:
    a first selective reduction NOx catalyst provided in an exhaust passage of the internal combustion engine,
      the first selective reduction NOx catalyst being configured to selectively reduce NOx in exhaust gas of the internal combustion engine with a reducing agent, and the reducing agent being ammonia;
    a first addition valve provided in the exhaust passage on an upstream side of the first selective reduction NOx catalyst in an exhaust gas flow direction,
      the first addition valve being configured to add an additive toward an end surface on the upstream side of the first selective reduction NOx catalyst, and the additive being one of the ammonia and a precursor of the ammonia;
    a second addition valve provided in the exhaust passage on a downstream side of the first selective reduction NOx catalyst in the exhaust gas flow direction,
      the second addition valve being configured to add the additive toward an end surface on the downstream side of the first selective reduction NOx catalyst; and
    an electronic control unit configured to control addition of the additive from the first addition valve and addition of the additive from the second addition valve,
    as a result of the electronic control unit determining that a flow rate of the exhaust gas flowing in the exhaust passage is equal to or lower than a predetermined flow rate when the ammonia is to be adsorbed onto the first selective reduction NOx catalyst, the electronic control unit being configured to allow the additive to be added from both of the first addition valve and the second addition valve.

2. The exhaust gas control system for the internal combustion engine according to claim 1,
    wherein the electronic control unit is configured to determine that the flow rate of the exhaust gas flowing in the exhaust passage is equal to or lower than the predetermined flow rate when an operation of the internal combustion engine is stopped.

3. The exhaust gas control system for the internal combustion engine according to claim 1, further comprising:
    a pressure regulator configured to regulate addition pressure of the additive from the second addition valve,
    wherein, as a result of the electronic control unit determining that the flow rate of the exhaust gas flowing in the exhaust passage is high when the electronic control unit allows the additive to be added from both of the first addition valve and the second addition valve such that ammonia is adsorbed onto the first selective reduction NOx catalyst, the pressure regulator is configured to regulate the addition pressure of the additive from the second addition valve such that the addition pressure when the flow rate of the exhaust gas is high is higher than the addition pressure when the flow rate of the exhaust gas is low.

4. The exhaust gas control system for the internal combustion engine according to claim 1, further comprising:
    a second selective reduction NOx catalyst provided in the exhaust passage on a downstream side of the second addition valve, the second selective reduction NOx catalyst being configured to selectively reduce NOx in the exhaust gas with the reducing agent added from the second addition valve; and
    a pressure regulator configured to regulate addition pressure of the additive from the second addition valve,
    wherein, as a result of the electronic control unit determining that the flow rate of the exhaust gas flowing in the exhaust passage is equal to or lower than the predetermined flow rate when the electronic control unit allows the additive to be added from the second addition valve such that the ammonia is adsorbed onto the second selective reduction NOx catalyst, the pressure regulator is configured to regulate the addition pressure such that the addition pressure when the additive is added from the second addition valve in order to add the additive to the second selective reduction NOx catalyst is lower than the addition pressure when the additive is added from the second addition valve in order to allow the ammonia to be adsorbed onto the first selective reduction NOx catalyst.

5. The exhaust gas control system for the internal combustion engine according to claim 1, further comprising:
    a second selective reduction NOx catalyst provided in the exhaust passage on a downstream side of the second addition valve, the second selective reduction NOx catalyst being configured to selectively reduce NOx in the exhaust gas with the reducing agent added from the second addition valve; and
    a heater configured to heat the additive added from the second addition valve,
    wherein, as a result of the electronic control unit determining that the flow rate of the exhaust gas flowing in the exhaust passage is equal to or lower than the predetermined flow rate when the electronic control unit allows the additive to be added from the second addition valve such that the ammonia is adsorbed onto the second selective reduction NOx catalyst, the heater is configured to heat the additive added from the second addition valve.

6. A control method for an internal combustion engine, the internal combustion engine including an exhaust gas control system,
    the exhaust gas control system including a first selective reduction NOx catalyst provided in an exhaust passage of the internal combustion engine, a first addition valve provided in the exhaust passage on an upstream side of the first selective reduction NOx catalyst in an exhaust gas flow direction, a second addition valve provided in the exhaust passage on a downstream side of the first selective reduction NOx catalyst in the exhaust gas flow direction, and an electronic control unit configured to control addition of an additive from the first addition valve and addition of the additive from the second addition valve,
    the first selective reduction NOx catalyst being configured to selectively reduce NOx in the exhaust gas of the internal combustion engine with a reducing agent, and
    the reducing agent being ammonia,
    the first addition valve being configured to add the additive toward an end surface on the upstream side of the first selective reduction NOx catalyst, and the second addition valve being configured to add the additive toward an end surface on the downstream side of the first selective reduction NOx catalyst, and the additive being one of the ammonia and a precursor of the ammonia, the control method comprising:

determining, by the electronic control unit, whether or not an exhaust gas flow rate is equal to or lower than a predetermined flow rate; and adding the additive onto the first selective reduction NOx catalyst from both of the first addition valve and the second addition valve, as a result of the electronic control unit determining that the flow rate of the exhaust gas flowing in the exhaust passage is less than the predetermined flow rate when the electronic control unit allows the ammonia to be adsorbed onto the first selective reduction NOx catalyst.

* * * * *